(12) United States Patent
Sugiura et al.

(10) Patent No.: US 7,093,276 B2
(45) Date of Patent: Aug. 15, 2006

(54) CATV TRUNK AMPLIFIER, UPWARD SIGNAL AMPLIFIER, AND BI-DIRECTIONAL CATV SYSTEM

(75) Inventors: Toshihiro Sugiura, Nisshin (JP); Hironori Goto, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 1222 days.

(21) Appl. No.: 09/800,276

(22) Filed: Mar. 5, 2001

(65) Prior Publication Data

US 2001/0022002 A1  Sep. 13, 2001

(30) Foreign Application Priority Data

Mar. 7, 2000  (JP) ............... 2000-062018

(51) Int. Cl.
H04N 7/173 (2006.01)
H04N 7/16 (2006.01)
H04B 3/36 (2006.01)
H04B 3/58 (2006.01)
H04B 7/14 (2006.01)

(52) U.S. Cl. ............. 725/127; 725/126; 725/129; 725/149; 455/14; 455/15; 375/257

(58) Field of Classification Search ............ 725/127, 725/149, 126, 129; 455/14–15; 375/257
See application file for complete search history.

(56) References Cited

U.S. PATENT DOCUMENTS 3,924,187 A * 12/1975 Dormans ............... 725/128
4,982,440 A * 1/1991 Dufresne et al. ......... 725/127
5,126,840 A * 6/1992 Dufresne et al. ......... 725/127
5,768,682 A * 6/1998 Peyrovian ............... 725/128
5,822,677 A * 10/1998 Peyrovian ............... 725/126
6,049,693 A * 4/2000 Baran et al. ............. 725/127
6,581,208 B1 * 6/2003 Inaguma ................. 725/149
6,598,232 B1 * 7/2003 McAlear ................. 725/118

FOREIGN PATENT DOCUMENTS

JP  02-127824  5/1990

OTHER PUBLICATIONS

Harry Newton, Newton's Telecom Dictionary, Feb. 2002, CMP Books, Eighteenth Edition, pp. 49 and 623.*

* cited by examiner

*Primary Examiner*—John Miller
*Assistant Examiner*—Michael W. Hoye

(57) ABSTRACT

In a CATV trunk amplifier, a downward signal input to an input terminal from the center equipment side is input to a downward amplifying circuit via a first filter and a second filter. The amplified downward signal is output to the terminal device side via the second filter, the first filter, and an output terminal. An upward L signal is input from the terminal device side via the output terminal to an upward L amplifying circuit via the first filter and a third filter. The amplified upward L signal is output to the center equipment side via the third filter, the first filter, and the input terminal. An upward H signal is input to an upward H amplifying circuit via a fourth filter. The amplified upward H signal is output to the center equipment side via the fourth filter and the input terminal.

3 Claims, 7 Drawing Sheets

CATV TRUNK AMPLIFIER 4 (CATV EXTENDER AMPLIFIER 4')

CATV TRUNK AMPLIFIER, UPWARD SIGNAL AMPLIFIER, AND BI-DIRECTIONAL CATV SYSTEM

BACKGROUND OF THE INVENTION i) Technical Field of the Invention

This invention relates to a CATV amplifier provided on a transmission line from the center equipment of a bi-directional CATV system to terminal devices, respectively amplifying upward signals and downward signals bi-directionally flowing through the transmission line.

ii) Description of the Related Art

Conventional CATV amplifiers are provided on a trunk connected to center equipment and branch lines, branching from the trunk, in a bi-directional CATV system. They amplify bi-directional signals flowing through the transmission lines. Such CATV amplifiers (specifically, CATV trunk amplifiers, CATV trunk bridger amplifiers, CATV extender amplifiers, and CATV bridger amplifiers provided on the branch lines branching from the trunk) comprise a downward amplifying circuit for amplifying a downward signal transmitted from the center equipment to the terminal devices, and an upward amplifying circuit for amplifying an upward signal transmitted from the terminal devices to the center equipment.

In recent years, not only a conventional frequency band (for example, ranging from 5 to 42 MHz) lower than the frequency band of the downward signal (for example, ranging from 54 to 722 MHz) but also a frequency band (for example, ranging from 770 to 890 MHz) higher than the frequency band of the downward signal, are set for the frequency bands of the upward signals in order to increase the amount of information transmitted from the terminal devices to the center equipment. Accordingly, a bi-directional CATV system has been proposed using these two types of frequency bands to transmit a higher volume of upward signals.

A CATV amplifier used in such a system is required to amplify the upward signals in different frequency bands. Therefore, as disclosed in the Unexamined Japanese Patent Publication No. 2-127824 for example, an upward L signal path, for passing a low-frequency upward signal (hereinafter, referred to as an upward L signal), and an upward H and downward signal path for passing a high-frequency upward signal (hereinafter, referred to as an upward H signal) and a downward signal, are formed by the use of a pair of directional wave filters connected to the input and output terminals for transmission signals connected to the transmission lines on the center equipment side and on the terminal device side, respectively. Then, an upward H signal path for passing the upward H signal and a downward signal path for passing the downward signal are formed by the use of a pair of directional wave filters arranged at both ends of the upward H and downward signal path. Lastly, amplifying circuits for amplifying each of the signals (the upward L signal, the upward H signal, and the downward signal) are provided on these paths (an upward L signal path, an upward H signal path, and a downward signal path).

However, in the conventional CATV amplifier constituted as above, the upward H signal, of which the transmission losses in the transmission line increase the most of these three types of transmission signals flowing through the transmission line of the bi-directional CATV system, has to pass through two directional wave filters before being input into the amplifying circuit (hereinafter, referred to as an upward H amplifying circuit). In addition, the upward H signal, after being amplified by the upward H amplifying circuit, also has to pass through two directional wave filters. As a result, there is a problem in that the transmission losses of the upward H signal in the conventional CATV amplifier increase twice as large as the transmission losses of the upward L signal, and the CN ratio (carrier-to-noise ratio) of the upward H signal is reduced.

Furthermore, it is necessary to increase the gain of the upward H amplifying circuit in order to compensate for the transmission losses of the upward H signal, and to secure the CN ratio. For that purpose, the power supply to the upward H amplifying circuit has to be increased. Thus, there arises another problem in that the power consumption of the entire CATV amplifier is also increased.

Specifically, since the transmission losses of the upward H signal are larger than the transmission losses of the other transmission signals (the downward signal and upward L signal), it is necessary to set the gain of the upward H amplifying circuit to be larger than the gain of the other amplifying circuits (the downward amplifying circuit and upward L amplifying circuit) used for amplifying the other transmission signals. In the above-described conventional CATV amplifier, the transmission losses generated when the upward H signal passes through a passing path in the amplifier become larger than the transmission losses of the upward L signal due to the two directional wave filters. Therefore, the gain of the upward H amplifying circuit has to be made larger than the gain of the other amplifying circuits.

In order to accomplish the above task, the gain of the transistors used for amplifying the signals, constituting the upward H amplifying circuit, has to be made larger than the gain of the transistors used for the other amplifying circuits. Alternatively, the connection number of the transistors has to be set larger than the connection number of the other amplifying circuits. Then, the energy supplied to the upward H amplifying circuit also has to be set larger than the energy of the other amplifying circuits. Accordingly, the power consumption of the entire CATV amplifier is also caused to increase.

Furthermore, as the power consumption of the CATV amplifier is increased, distortion due to the hum modulation generated in the CATV amplifier grows larger. Therefore, in a general bi-directional CATV system supplying power from a power unit to a plurality of CATV amplifiers via the transmission lines, there is another problem in that the distortion due to the hum modulation cannot be ignored.

Specifically, in the bi-directional CATV system a power unit, transforming the commercial power of 50 Hz or 60 Hz to generate alternating current power signals of tens of V, is provided at one per several CATV amplifiers. The alternating current power signals generated by this power unit are supplied to each CATV amplifier via the transmission line. The distortion due to the hum modulation grows larger as the energy supplied to the internal amplifying circuit of each CATV amplifier is increased, and also grows larger in the entire system as the cascading number of CATV amplifiers is increased. Therefore, when the power consumption per CATV amplifier increases as above, the distortion due to the hum modulation generated in the entire system cannot be ignored.

SUMMARY OF THE INVENTION

One object of the present invention, in a bi-directional CATV system, not only transmitting a downward signal and an upward L signal, with a frequency lower than the frequency of the downward signal, but also transmitting an upward H signal with a frequency higher than the frequency of the downward signal, is to reduce the transmission losses of the upward H signal at a CATV amplifier so that the CN ratio and the distortion due to the hum modulation in the entire system can be improved.

In order to attain the above object, a first aspect of this invention provides a CATV amplifier in which, out of the transmission signals flowing through the transmission line of a bi-directional CATV system, the downward signal, input to a first terminal from the transmission line on the center equipment side, is input to a downward amplifying circuit via a first filter and a second filter. The upward L signal, input from the transmission line on the terminal device side to a second terminal, is input to an upward L amplifying circuit via the first filter and a third filter. And the upward H signal, also input from the transmission line on the terminal device side to the second terminal, is input to an upward H amplifying circuit via a fourth filter.

Additionally, in the signals amplified at each of the amplifying circuits, the downward signal, amplified at the downward amplifying circuit, is transmitted to the transmission line on the terminal device side via the second filter, the first filter, and the second terminal. The upward L signal, amplified at the upward L amplifying circuit, is transmitted to the transmission line on the center equipment side via the third filter, the first filter, and the first terminal. And the upward H signal, amplified at the upward H amplifying circuit, is transmitted to the transmission line on the center equipment side via the fourth filter and the first terminal.

According to a CATV amplifier of the present invention for the three types of transmission signals flowing through the transmission line of the bi-directional CATV system, the upward H signals, of which the transmission losses in the transmission line grow the most significantly, only pass through the fourth filters provided in the former and latter stages of the upward H amplifying circuit. Therefore, the passing count of the filters (the aforementioned directional wave filters) can be reduced from four to two, as compared with the case of an aforementioned conventional CATV amplifier.

According to a first aspect of the present invention, the transmission loss of the upward H signal in the CATV amplifier can be reduced approximately in half as compared to the transmission loss of a conventional CATV amplifier. In addition, the lowering of the CN ratio of the upward H signal is avoided. Also, the gain of the upward H amplifying circuit can be smaller than the gain of a conventional one. As the power consumption at the CATV amplifier is reduced, the generation of distortion due to the hum modulation can be controlled.

The effect of reducing the power consumption and the distortion due to the hum modulation is quite small for a single CATV amplifier. However, a bi-directional CATV system adopting the CATV amplifier of the present invention can comprise multiple cascading connections of CATV amplifiers on the transmission line. Therefore, a second aspect of the present invention provides a bi-directional CATV system using the CATV amplifiers of a first aspect of the present invention, which can effectively reduce the power consumption and the distortion due to the hum modulation in the entire bi-directional CATV system.

A third aspect of the present invention is to provide an upward signal amplifier externally attached to an existing CATV amplifier and capable of amplifying both the downward signal and the upward L signal, with a frequency lower than the frequency of the downward signal, to constitute a CATV amplifier of a first aspect of the invention.

The upward signal amplifier of the present invention comprises a third terminal and a fourth terminal for respectively connecting the upward signal amplifier to the transmission line on the center equipment side and on the terminal device side; a fifth terminal and a sixth terminal for respectively connecting the upward signal amplifier to a terminal for inputting the downward signal and outputting the upward L signal and a terminal for inputting the upward L signal and outputting the downward signal of the existing CATV amplifier; and an upward H amplifying circuit for amplifying the upward H signal, with a frequency higher than the downward signal.

When each of the previous terminals is connected to a corresponding transmission line or terminal of the CATV amplifier, the downward signal, transmitted via the transmission line on the center equipment side, is input into the upward signal amplifier via the third terminal so as to be output to the terminal for inputting the downward signal and outputting the upward L signal of the CATV amplifier via the first filter and the fifth terminal. As a result, the downward signal is amplified at the CATV amplifier and output from the terminal for inputting the upward L signal and outputting the downward signal of the CATV amplifier. The downward signal, after amplification, is again input into the upward signal amplifier via the sixth terminal so as to be transmitted to the transmission line on the terminal device side via the first filter and the fourth terminal.

The upward L signal, transmitted via the transmission line on the terminal device side, is, after being input to the upward signal amplifier via the fourth terminal, output to the terminal for inputting the upward L signal and outputting the downward signal of the CATV amplifier via the first filter and the sixth terminal. As a result, the upward L signal, as well as the downward signal, is amplified at the CATV amplifier and output from the terminal for inputting the downward signal and outputting the upward L signal of the CATV amplifier. The upward L signal is again input into the upward signal amplifier via the fifth terminal and later output to the transmission line on the center equipment side via the first filter and the third terminal.

In the mean time, the upward H signal, transmitted via the transmission line on the terminal device side, is input to the upward H amplifying circuit to be amplified in the upward signal amplifier via the fourth terminal and the fourth filter. Then, the upward H signal, after amplification, is output to the transmission line on the center equipment side via the fourth filter and the third terminal.

According to the upward signal amplifier of a third aspect of the present invention in the bi-directional CATV system, it is not only possible to amplify the upward H signal transmitted from the terminal device side at the upward H amplifying circuit and transmit the upward H signal to the center equipment side, but it is also possible to respectively output the downward signal, transmitted from the center equipment side, and the upward L signal, transmitted from the terminal device side, to the existing CATV amplifier in order to amplify and respectively transmit them to the terminal device side and to the center equipment side. According to the upward signal amplifier of a third aspect of the present invention externally attached to the existing CATV amplifier, capable of amplifying the downward signal and the upward L signal, it is possible to constitute a CATV amplifier capable of respectively amplifying the downward signal, upward L signal, and upward H signal.

In the upward signal amplifier of a third aspect of the present invention, the upward H signal, with the highest frequency of the three types of transmission signals, only passes through the fourth filters provided at the former and latter stages of the upward H amplifying circuit, just as in a CATV amplifier of a first aspect of the present invention. Accordingly, the upward signal amplifier of a third aspect of the present invention, if externally attached to an existing CATV amplifier, can function as a CATV amplifier having the same effect as the CATV amplifier of a first aspect of the present invention. For example, it is quite advantageous for a case in which an existing bi-directional CATV system, capable of transmitting a downward signal and an upward L signal, is transformed into a system capable of also transmitting an upward H signal.

When the CATV amplifier of a first aspect of the present invention constitutes an upward signal amplifier externally attached to an existing CATV amplifier, not only is a power supply necessary for the amplifiers (the downward amplifying circuit and the upward L amplifying circuit) of the existing amplifiers, but also for the upward H amplifying circuit in the upward signal amplifier.

In the existing CATV amplifier, there generally is provided a power supply circuit for generating a power voltage, used for driving the amplifying circuits, upon the receipt of alternating current power signals transmitted via the transmission line. Therefore, it is possible to provide a similar power supply circuit for the upward signal amplifier. However, in order to supply the alternating current power signals transmitted via the transmission line to the power supply circuit in each of the amplifiers, if, for example, the alternating current power signals are separated from the other transmission signals using a power separation filter provided in the upward signal amplifier and the separated alternating current power signals are supplied to the power supply circuits in each of the amplifiers, then the amount of current flowing through the power separation filter becomes equal to the amount of current consumed by all three types of amplifying circuits. Consequently, the distortion due to the hum modulation generated in each of the amplifiers grows larger.

To prevent the above from occurring, a fourth aspect of the present invention provides a pair of power separation filters in the upward signal amplifier, at least arranged either between the third terminal and the first and fourth filters, or between the fourth terminal and the first and fourth filters. The pair of power separation filters is used for separating the alternating current power signals for a power supply from each transmission signal. The power supply is transmitted from an external power unit to the third terminal or the fourth terminal via the transmission line. Additionally, the power supply is conducted from the power supply circuit, generating a power voltage upon receipt of the alternating current power signals separated at one of the power separation filters, to the upward H amplifying circuit. The alternating current power signals separated at the other power separation filter is supplied via the fifth terminal or the sixth terminal to the existing CATV amplifier connected via the fifth terminal and the sixth terminal.

In this manner, the amount of current flowing through each power separation filter can be respectively restricted to the amount of current corresponding to the power consumption at the upward H amplifying circuit and the power consumption at the existing CATV amplifier (particularly, the downward amplifying circuit and the upward L amplifying circuit). The distortion due to the hum modulation generated by the increase in the amount of current can be controlled.

When the alternating current power signals are transmitted via the transmission line on the center equipment side, the above pair of power separation filters can be provided between the third terminal and the first and fourth filters. When the alternating current power signals are transmitted via the transmission line on the terminal device side, the power separation filters can be provided between the fourth terminal and the first and fourth filters. The pair of power separation filters can also be provided both between the third terminal and the first and fourth filters and between the fourth terminal and the first and fourth filters. So that, when the alternating current power signals are transmitted via the transmission line on the center equipment side, the pair of power separation filters provided between the third terminal and the first and fourth filters can be operated. When the alternating current power signals are transmitted via the transmission line on the terminal device side, the pair of power separation filters provided between the fourth terminal and the first and fourth filters can be operated.

The technique of reducing the hum modulation by providing a pair of power separation filters can be applied to a sole CATV amplifier of a first aspect of the present invention. That is, the technique of supplying the alternating current power signals separated at one of the power separation filters to the upward H amplifying circuit, and supplying the alternating current power signals separated at the other of the power separation filters to the downward amplifying circuit and the upward L amplifying circuit.

Since the above power separation filters separate the low-frequency alternating current power signals (generally with 50 Hz or 60 Hz, which is the same frequency as the frequency of commercial power) from the high-frequency transmission signals, they comprise condensers for passing the transmission signals and choke coils for passing the alternating current power signals. If the fourth filters constitute a high pass filter capable of cutting off the alternating current power signals, and the first filters constitute a low pass filter capable of passing the alternating current power signals, then these filters can be used for the power separation filters.

An upward signal amplifier of the fifth aspect of the present invention is provided with a pair of separation filters. One of the pair of separation filters for supplying the alternating current power signals to the power supply circuit in the upward signal amplifier constitutes the fourth filter and a choke coil connecting between at least the third terminal or the fourth terminal and the power supply circuit. The other of the pair of separation filters for supplying the alternating current power signals to the existing CATV amplifier, which is a low pass filter, constitutes the first filter.

Accordingly, there is no need to provide a pair of exclusive filter circuits comprising a condenser and a choke coil as a pair of power separation filters. Thus, the configuration of the upward signal amplifier is simplified.

A sixth aspect of the present invention provides a bi-directional CATV system comprising a plurality of existing CATV amplifiers, to which the above upward signal amplifier is added, arranged on a transmission line between the center equipment and the terminal devices. According to this bi-directional CATV system, it is possible to build a bi-directional CATV system capable of transmitting an upward H signal, in addition to the downward signal and the upward L signal, by using an existing CATV amplifier capable of amplifying a downward signal and an upward L signal.

Thus, this aspect is economical, as compared to the case of building the bi-directional CATV system in a second aspect of the invention, which utilizes the CATV amplifier in a first aspect of the present invention.

Additionally, if the upward signal amplifier in a fourth or fifth aspect of the present invention is used for building this bi-directional CATV system, it is possible to reduce the distortion due to the hum modulation generated in each of the CATV amplifiers provided on the transmission line. Consequently, this restricts the hum modulation of the entire system.

Furthermore, the larger the connection number is of CATV amplifiers cascaded on the transmission line, the worse the hum modulation becomes in the entire bi-directional CATV system. Accordingly, when a bi-directional CATV system is built using an upward signal amplifier (and CATV amplifier) comprising a pair of power separation filters (one for the upward H amplifying circuit and the other for the downward amplifying circuit and the upward L amplifying circuit), it is possible to increase the number of CATV amplifiers as compared to the case of a bi-directional CATV system using CATV amplifiers comprising one power separation filter common to each of the amplifying circuits. Thus, it is possible to build a larger-scale system.

Specifically, the number of CATV amplifiers needed to hold the hum modulation of the entire system down to a rated value depends on how large is the distortion due to the hum modulation generated in each of the CATV amplifiers. Thus, when a bi-directional CATV system capable of transmitting an upward H signal is built using the upward signal amplifier in a fourth or fifth aspect of the present invention, it is possible to extend the transmission line or to increase the number of subscriber terminal devices by increasing the number of CATV amplifiers capable of being cascaded on the transmission line.

A seventh aspect of the present invention provides a bi-directional CATV system using a conventional CATV amplifier to which an upward signal amplifier is externally attached, as in a sixth aspect of the present invention. In which, in a plurality of CATV amplifiers connected via the upward signal amplifier to the transmission line, the fourth terminal and the sixth terminal of the upward signal amplifier, provided for a first CATV amplifier located at a predetermined distance from the center equipment, are terminated at the characteristic impedance of the transmission line. Additionally, a terminal for inputting an upward L signal and outputting a downward signal of the first CATV amplifier is directly connected via the transmission line to a terminal for inputting the downward signal and outputting the upward L signal of a second CATV amplifier, located at the stage next to the first amplifier. Further, the fifth terminal of the upward signal amplifier, provided for the second CATV amplifier, is terminated at the characteristic impedance of the transmission line. And still further, the third terminal of the upward signal amplifier, provided for the second CATV amplifier, is connected to the center equipment via an optical transmission path capable of converting an electrical signal to an optical signal.

In this manner, it is possible to directly transmit the upward H signal, transmitted via the CATV amplifiers located closer to the terminal device side than the second CATV amplifier, to the center equipment via the optical transmission path. Thus, confluent noises transmitted to the center equipment, created on the transmission line by noise in the transmission frequency band of the upward H signal generated on the terminal device side, are reduced. The accuracy of receiving the upward H signal on the center equipment side can then be improved.

BRIEF DESCRIPTION OF THE DRAWINGS

The invention will now be described, by way of example, with reference to the accompanying drawings, in which.

DETAILED DESCRIPTION OF THE INVENTION

Figure 1:
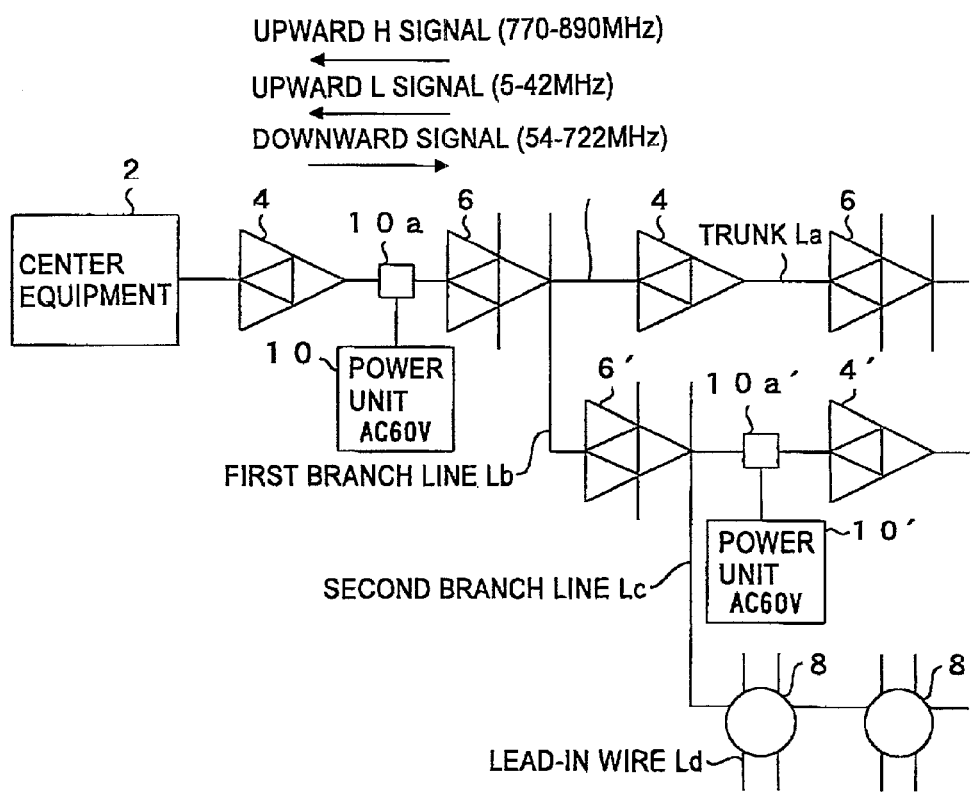
FIG. 1 is a diagram showing an overall constitution of a bi-directional CATV system of an embodiment, according to the present invention.

As shown in FIG. 1, a bi-directional CATV system of the present embodiment transmits a downward signal in a predetermined transmission frequency band (for example, ranging from 54 to 722 MHz) from the center equipment 2 to a terminal device. The bi-directional CATV system of the present embodiment also respectively transmits an upward L signal, in a transmission frequency band (for example, ranging from 5 to 42 MHz) lower than the frequency band of the downward signal, and an upward H signal, in a frequency band (for example, ranging from 770 to 890 MHz) higher than the frequency band of the downward signal, from the terminal device to the center equipment 2.

The bi-directional CATV system comprises, as transmission lines for bi-directionally transmitting the aforementioned signals between the center equipment 2 and the terminal devices on the side of subscribers of the CATV system, a trunk La connected to the center equipment 2. The system also comprises a plurality of first branch lines Lb, branching from the trunk La via CATV trunk bridger amplifiers 6 provided on the trunk La, and not-illustrated directional couplers. In addition, the system comprises a plurality of second branch lines Lc, branching from the first branch lines Lb via CATV bridger amplifiers 6' provided on each of the first branch lines Lb, and not-illustrated directional couplers. The system still further comprises lead-in wires Ld, branching from the second branch lines Lc via tap-offs (directional couplers) 8 provided on the second branch lines Lc, and also extending to not-illustrated protectors on the subscriber side. In the present embodiment, all of these lines (transmission lines) are made of coaxial cables and their characteristic impedance is 50 Ω or 75 Ω.

CATV trunk amplifiers 4, for amplifying the transmission signals flowing bi-directionally through the trunk La and the aforementioned CATV trunk bridger amplifiers 6, are cascaded to the trunk La at predetermined intervals as the CATV amplifiers of the present invention. CATV extender amplifiers 4', for amplifying the transmission signals flowing bi-directionally through the first branch lines Lb and the aforementioned CATV bridger amplifiers 6', are also cascaded to the first branch lines Lb at predetermined intervals as the CATV amplifiers of the present invention.

Alternating current power signals (for example, 60 Hz, AC60V), which is a stepped-down commercial power, flow through the trunk La and the first branch lines Lb via the power signal overlay circuits 10*a* and 10*a'*. Power units 10 and 10', for supplying power to each of the amplifiers 4, 6, and 4', 6', are provided on the trunk La and the first branch lines Lb. The ratio of the power unit 10 (or 10') to the amplifiers 4, 6 (or 4', 6') arranged on the trunk La (or the first branch lines Lb) is one to many (for example, eight).

Now, a configuration is described of each of the amplifiers 4, 6, 4', 6' provided on the trunk La and the first branch lines Lb as above. The CATV trunk amplifier 4 and the CATV extender amplifier 4', and the CATV trunk bridger amplifier 6 and the CATV bridger amplifier 6', are respectively configured in the same manner and are different only in the characteristics (such as the gain) of the internal amplifying circuits. Accordingly, only the constitutions of the CATV trunk amplifier 4 and the CATV trunk bridger amplifier 6 provided on the trunk La are explained. The explanation of the constitutions of the CATV extender amplifier 4' and the CATV bridger amplifier 6' provided on the first branch lines Lb is omitted.

Figure 2:
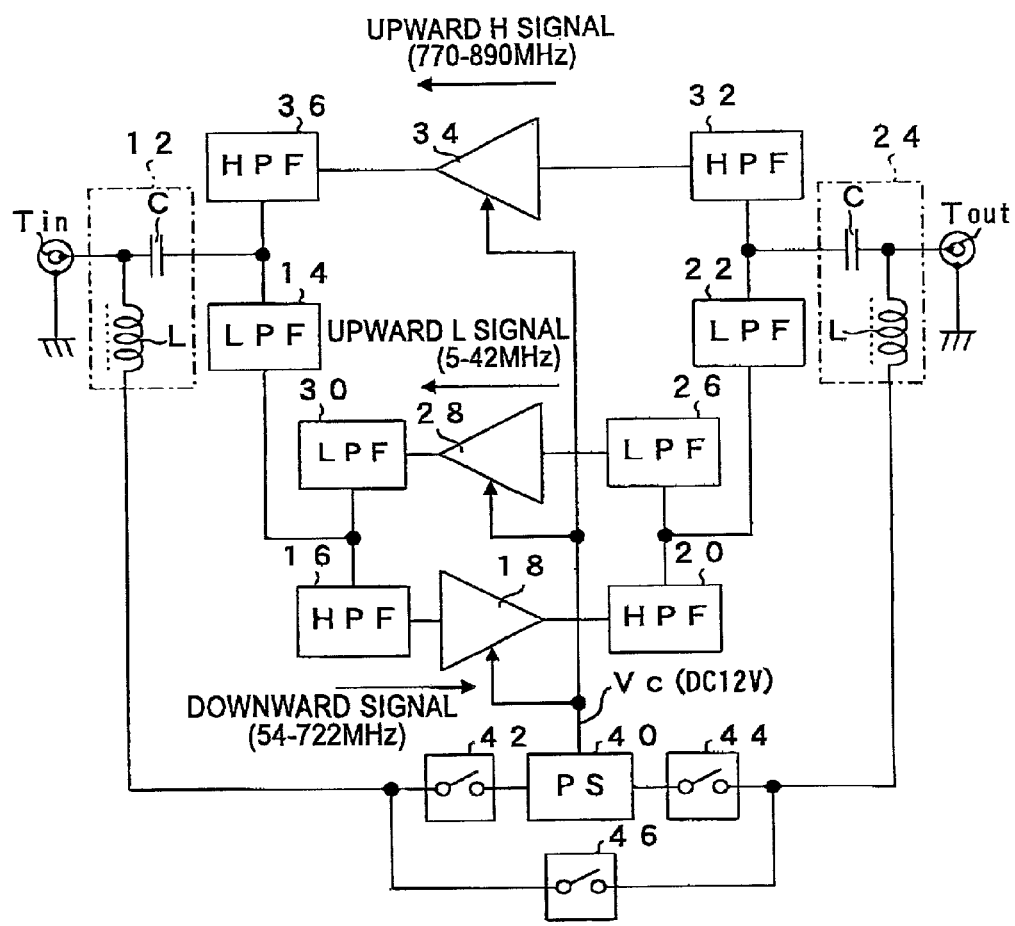
FIG. 2 is a block diagram showing a constitution of a CATV trunk amplifier (CATV extender amplifier) of an embodiment.

As shown in FIG. 2, the CATV trunk amplifier 4 comprises an input terminal Tin and an output terminal Tout for respectively connecting the transmission line (trunk La) on the center equipment 2 side and on the terminal device side.

The downward signal, input to the input terminal Tin via the transmission line on the center equipment 2 side, is input to a downward amplifying circuit 18 for amplifying the downward signal via a power separation filter 12, a low pass filter (hereinafter, referred to as LPF) 14, and a high pass filter (hereinafter, referred to as HPF) 16. The downward signal is then amplified to a predetermined level at the downward amplifying circuit 18. After the amplification, the downward signal is transmitted to the output terminal Tout via a HPF 20, a LPF 22, and a power separation filter 24, and output to the transmission line on the terminal device side.

A cutoff frequency of the LPF 14 and LPF 22 is set to 722 MHz, for example, so that the LPF 14 and LPF 22 can selectively cut off the upward H signal and only pass the downward signal and the upward L signal. A cutoff frequency of the HPF 16 and HPF 20 is set to 54 MHz, for example, so that the HPF 16 and HPF 20 can selectively cut off the upward L signal and only pass the downward signal.

The power separation filters 12, 24 separate the aforementioned three types of transmission signals (the downward signal, the upward L signal, and the upward H signal) from the alternating current power signals supplied by the power unit 10. Each of the power separation filters 12, 24 comprises a condenser C, one end of which is connected to the input terminal Tin or the output terminal Tout so as to pass the above transmission signals (high-frequency signals), and a choke coil L, one end of which is connected to the input terminal Tin or the output terminal Tout so as to pass the low-frequency alternating current power signals. The other ends of the condensers C, constituting the power separation filters 12, 24, are connected to the aforementioned LPFs 14, 22 and further to HPFs 36, 32, as described later.

An upward L signal, input to the output terminal Tout via the transmission line on the terminal device side, is input to an upward L amplifying circuit 28 for amplifying the upward L signal via the power separation filter 24, the LPF 22 and a LPF 26. The upward L signal is then amplified to a predetermined level at the upward L amplifying circuit 28. After amplification, the upward L signal is transmitted to the input terminal Tin via a LPF 30, a LPF 14, and the power separation filter 12, and output to the transmission line on the center equipment 2 side. A cutoff frequency of the LPF 26 and LPF 30 is set to 42 MHz, for example, so that the LPF 26 and LPF 30 can selectively cut off the downward signal and only pass the upward L signal.

An upward H signal, input to the output terminal Tout via the transmission line on the terminal device side, is input to an upward H amplifying circuit 34 for amplifying the upward H signal via the power separation filter 24 and the HPF 32. The upward H signal is then amplified to a predetermined level at the upward H amplifying circuit 34. After amplification, the upward H signal is transmitted to the input terminal Tin via the HPF 36 and the power separation filter 12, and output from the input terminal Tin to the transmission line on the center equipment 2 side. A cutoff frequency of the HPF 32 and HPF 36 is set to 770 MHz, for example, so that the HPF 32 and HPF 36 can selectively cut off the downward signal and the upward L signal and only pass the upward H signal.

The other ends of the choke coils L of the power separation filters 12, 24 are connected to a power supply circuit (PS) 40 via switches 42, 44, and are also connected to each other via a switch 46.

These switches 42, 44, and 46, are provided so that a system administrator of the CATV system can manually switch the connecting state of the paths between the switches. For instance, when a power unit 10, supplying power to the CATV trunk amplifier 4, is located on the center equipment 2 side as compared to the CATV trunk amplifier 4, the switch 42 is turned ON and the switch 44 is turned OFF in order to supply the alternating current power signals from the power unit 10 to the power supply circuit 40.

The switch 46 is turned ON when the power unit 10, supplying power to the CATV trunk amplifier 4, supplies power to an amplifier arranged at a farther side across the CATV trunk amplifier 4. In other words, when the power unit 10 is required to supply the alternating current power signals to the amplifier arranged on the farther side across the CATV trunk amplifier 4, the switch 46 is turned ON. It is then possible to operate the CATV trunk amplifier 4 as what is called a power passing amplifier.

The power supply circuit 40 rectifies and smoothes the alternating current power signals (for example, AC60V) supplied from the external power unit 10 so as to generate a direct current constant voltage (for example, DC12V). The power supply circuit 40 supplies the generated direct current constant voltage to the above amplifying circuits 18, 28, and 34, as a power voltage Vc, so that the amplifying circuits 18, 28, and 34, can be operated.

Figure 3:
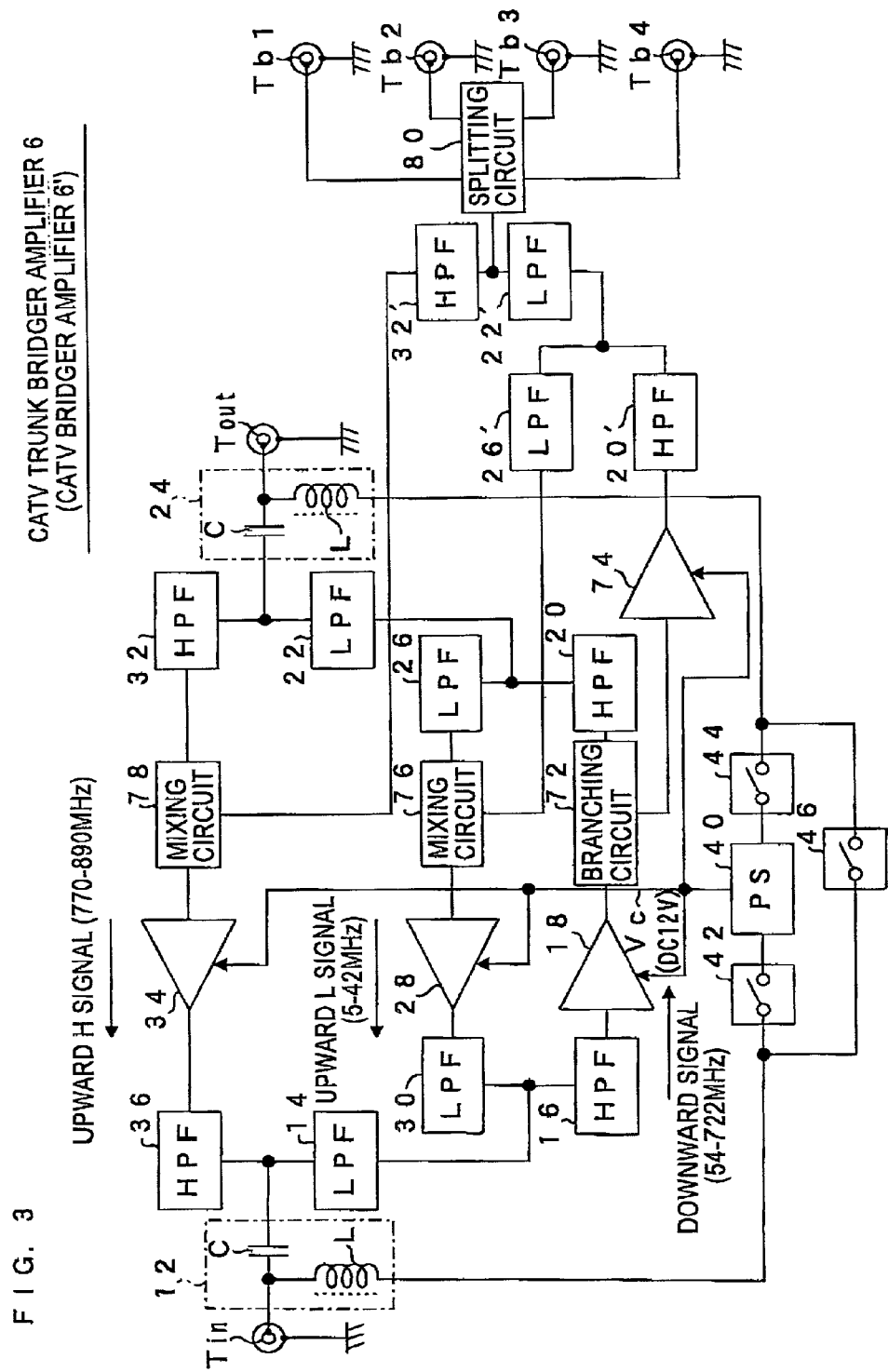
FIG. 3 is a block diagram showing a constitution of a CATV trunk bridger amplifier (CATV bridger amplifier) of an embodiment.

As shown in FIG. 3, the CATV trunk bridger amplifier 6 is basically constituted the same as the CATV trunk amplifier 4 shown in FIG. 2. The CATV trunk bridger amplifier 6 is constituted by adding the following circuits to a CATV trunk amplifier 4.

The CATV trunk bridger amplifier 6 comprises a branching circuit 72 for branching a part of the downward signal in the path of the downward signal from the downward amplifying circuit 18 to the HPF 20, and a branching amplifying circuit 74 for amplifying the downward signal branched at the branching circuit 72. The CATV trunk bridger amplifier 6 further comprises a mixing circuit 76 for mixing the upward L signal, transmitted via the first branch lines Lb, with the upward L signal transmitted via the trunk La in the path of the upward L signal from the LPF 26 to the upward L amplifying circuit 28, and a mixing circuit 78 for mixing the upward H signal, transmitted via the first branch lines Lb, with the upward H signal transmitted via the trunk La in the path of the upward H signal from the HPF 32 to the upward H amplifying circuit 34.

The CATV trunk bridger amplifier 6 comprises a plurality of branching terminals Tb (in the present embodiment, four branching terminals Tb1, Tb2, Tb3, and Tb4, are shown) so that the plurality of first branch lines Lb can be connected. Splitting terminals of a splitting circuit (in the present embodiment, a four-way splitting circuit) 80 are respectively connected to the branching terminals Tb1–Tb4. A common terminal of the splitting circuit 80 is connected to the mixing circuit 78 via a HPF 32' functioning the same as the aforementioned HPFs 32, 36, so that the upward H signal input to each of the branching terminals Tb1–Tb4 can be transmitted to the mixing circuit 78 via the branching circuit 80 and the HPF 32'.

One end of a LPF 22', functioning the same as the aforementioned LPFs 14, 22, is connected to the common terminal of the splitting circuit 80. The other end of the LPF 22' is connected to an output terminal of the branching amplifying circuit 74 via a HPF 20', functioning the same as the aforementioned HPFs 16, 20, and also connected to the mixing circuit 76 via a LPF 26', functioning the same as the aforementioned LPFs 26, 30.

Accordingly, the upward L signal input to each of the branching terminals Tb1–Tb4 is transmitted to the mixing circuit 76 via the splitting circuit 80, LPF 22', and LPF 26'. Additionally, the downward signal amplified at the branching amplifying circuit 74 is output to the transmission line (first branch line Lb) on the terminal device side from each of the branching terminals Tb1–Tb4 via the HPF 20', LPF 22' and splitting circuit 80.

The power supply circuit 40 not only supplies the direct current constant voltage (DC12V) to the downward amplifying circuit 18, upward L amplifying circuit 28, and upward H amplifying circuit 34, but also supplies to the branching amplifying circuit 74 so that the branching amplifying circuit 74 can be operated.

As described above, in the CATV amplifier (not only the CATV trunk amplifier 4 and the CATV trunk bridger amplifier 6, but also the CATV extender amplifier 4' and the CATV bridger amplifier 6') of the present embodiment, a pair of the HPFs 32 (or 32') and 36 arranged in the former and latter stages of the upward H amplifying circuit 34, are provided as filters for extracting the upward H signal on the path through which passes the highest-frequency upward H signal of all of the transmission signals flowing through the transmission lines (such as trunk La, first branch lines Lb) of the bi-directional CATV system. Accordingly, it is possible to reduce the number of filters through which the upward H signal passes by half, which is, from four to two, as compared to the case of a conventional CATV amplifier.

The CATV amplifier of the present invention, thus, can reduce the transmission losses of the upward H signal in each amplifier by half, and prevent a lowering of the CN ratio of the upward H signal.

Specifically, the conventional filters for extracting the upward H signal constitute two-stage filters, respectively provided in the former and latter stages of the upward H amplifying circuit 34. If the transmission loss of the upward H signal in each filter is 0.5 dB, then a transmission loss of 2 dB can be generated per one CATV amplifier with conventional filters. This result is because the upward H signal passes through the filters four times per one CATV amplifier. However, in the present embodiment the upward H signal only passes through the HPF 32 (or 32') and HPF 36, so the transmission loss per one CATV amplifier becomes 1 dB. Since the lowering of a CN ratio per one CATV amplifier is determined by the transmission loss (0.5 dB) at the input part to the upward H amplifying circuit 34, the CN ratio can be improved per single CATV amplifier.

The effect of the improvement of the CN ratio in a single CATV amplifier is extremely small, since the effect at one filter is only 0.5 dB of transmission loss. However, in the entire bi-directional CATV system, the effect of the improvement of the CN ratio can be significantly large, for a plurality of CATV amplifiers (CATV trunk amplifiers 4 and CATV trunk bridger amplifiers 6, or CATV extender amplifiers 4' and CATV bridger amplifiers 6') are cascaded on the trunk La or the first branch lines Lb as shown in FIG. 1.

Specifically, when the CATV amplifiers of the present embodiment are cascaded, the CN ratio is improved by 0.5 dB of transmission loss at the first CATV amplifier (that is, the amplifier located the closest to the terminal device side). The transmission loss in the output part of the CATV amplifier in the former stage is added at the next CATV amplifier in and after the second stage. Therefore, the CN ratio is improved by approximately 1 dB of transmission loss per one CATV amplifier across the entire bi-directional CATV system.

The CN ratio is improved 1.26 times by reducing the transmission loss by 1 dB (10·log(n)=1 dB, (n)=1.26). For example, in the case of the bi-directional CATV system comprising 16 CATV amplifiers cascaded onto the trunk La, in which conventional CATV amplifiers used in a bi-directional CATV system are changed to the CATV amplifiers in the present embodiment, even if four CATV amplifiers (16 amplifiers multiplied by (1.26−1)=4.16) are further added to the bi-directional CATV system, the CN ratio in the entire system is not likely to be lowered.

Additionally, in the bi-directional CATV system, 20 or more subscriber terminal devices can generally be connected to a single CATV amplifier. Accordingly, if four CATV amplifiers can be added, over 80 subscriber terminal devices can be added.

When a bi-directional CATV system is constituted using CATV amplifiers (CATV trunk amplifiers 4, CATV trunk bridger amplifiers 6, CATV extender amplifiers 4', and CATV bridger amplifiers 6') of the present embodiment, it is possible to increase the number of CATV amplifiers and build a larger-scale system as compared to a system built using conventional CATV amplifiers.

On the other hand, according to the CATV amplifier (CATV trunk amplifier 4, CATV trunk bridger amplifier 6, CATV extender amplifier 4' and CATV bridger amplifier 6') of the present embodiment, the transmission loss of an upward H signal generated in the amplifier is improved by 1 dB as compared to a conventional CATV amplifier. Therefore, when a bi-directional CATV system adopting a CATV amplifier of the present embodiment is constituted with the same conditions as a system adopting conventional CATV amplifiers, the gain of the upward H amplifying circuit 34, showing the largest power consumption in the CATV amplifier due to its amplification of high-frequency signals, can be reduced by 1 dB. In addition, the power consumption of the circuit can be limited.

According to a CATV amplifier of the present embodiment, the power consumption of the CATV amplifier is reduced, and the generation of distortion due to the hum modulation is also restrained. The effect of reducing the power consumption and the distortion due to the hum modulation may be extremely small for a single CATV amplifier. However, in a bi-directional CATV system where such CATV amplifiers are cascaded onto the transmission line (such as trunk La and the first branch lines Lb), it is possible to significantly reduce the power consumption and the hum modulation.

In the above embodiment, the HPFs 32, 36, for cutting off the downward signal and the upward L signal and selectively passing the upward H signal, and the LPFs 14, 22, for cutting off the upward H signal and selectively passing the downward signal and the upward L signal, are connected to the input and output terminals Tin, Tout of the CATV amplifier (CATV trunk amplifier 4, CATV trunk bridger amplifier 6, CATV extender amplifier 4' and CATV bridger amplifier 6') as directional wave filters. Thus, the number of filters passing the upward H signal in the CATV amplifier is reduced from four to two (HPFs 32, 36). To reduce in half the number of filters passing the upward H signal in the CATV amplifier, the CATV amplifier may also be constituted as the referential example shown in FIG. 4.

Figure 4:
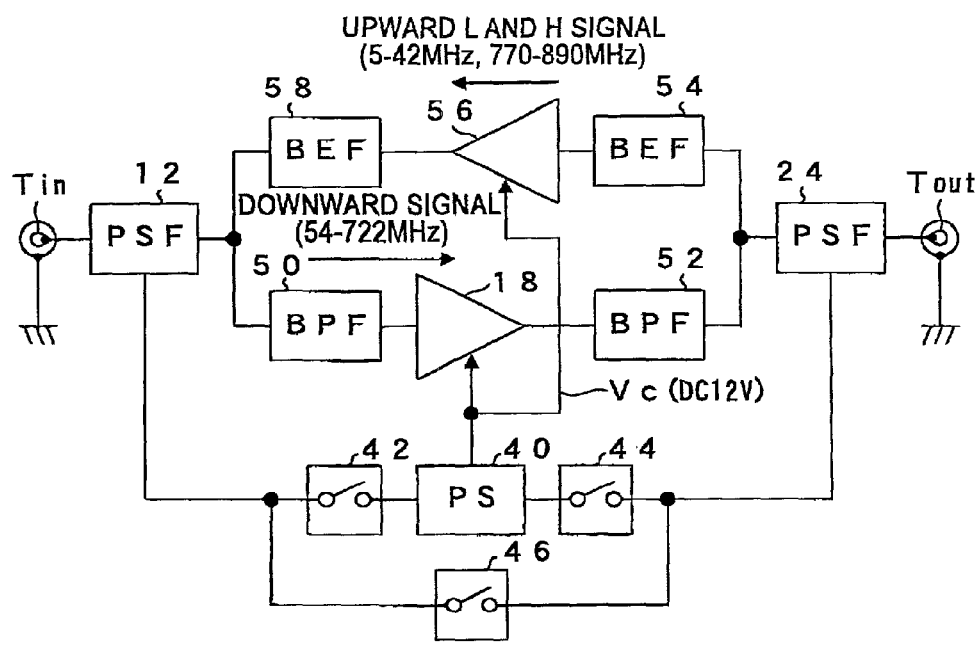
FIG. 4 is a block diagram showing a constitution of a CATV trunk amplifier (CATV extender amplifier) of a referential example, different from the invention.

FIG. 4 shows a referential example of a CATV trunk amplifier 4 (and CATV extender amplifier 4') reducing in half the number of filters that pass the upward H signal in a manner different than in the present invention. In this example, the band passing filters (band pass filters; hereinafter, referred to as BPFs) 50, 52 for cutting off the upward L signal and the upward H signal, and for selectively passing only the downward signal, and band eliminating filters (band eliminators; hereinafter, referred to as BEFs) 54, 58 for cutting off the downward signal and for selectively passing the upward L signal and the upward H signal, are respectively connected to the input terminal Tin and the output terminal Tout. The downward amplifying circuit 18 is then provided between the BPFs 50 and 52. Additionally, a broadband upward amplifying circuit 56, for amplifying the upward L signal and the upward H signal, is provided between the BEFs 54 and 58.

In the CATV amplifier of this example, the upward H signal passes through two filters (BEFs 54, 58) and the same effect can be achieved as with the previous embodiment. However, when the CATV amplifier is constituted as in the referential example, two types of upward signals in different frequency bands have to be amplified in the common upward amplifying circuit 56. There then arise a problem that the upward amplifying circuit 56 has to be made broadband, or otherwise. When a directional wave filter for separating signals constitutes the BPFs and BEFs, the designing becomes difficult as compared to a case of constituting a directional wave filter for separating signals using LPFs and HPFs. Specifically, a separate adjusting circuit is required in order to connect BPFs and BEFs without generating transmission loss at the connection points. Therefore, in practice, the filter constitution of the present invention is more beneficial.

In the referential example shown in FIG. 4, the power separation filters (PSF) 12, 24 are also provided between the input and output terminals Tin, Tout and each of the filters (BPFs 50, 52, and BEFs 54, 58) in the same manner as in the previous embodiment. As the alternating current power signals (for example, AC60V), separated in the power separation filter (PSF) 12 or 24, are supplied to the internal power supply circuit 40 via the switch 42 or 44, the power voltage Vc (for example, DC12V) is supplied to each of the above amplifying circuits 18, 56. The alternating current power signals are then transmitted to the other CATV amplifiers arranged on the transmission line (trunk La or first branch lines Lb) on the opposite side of the external power unit 10 via the switch 46.

Figure 5:
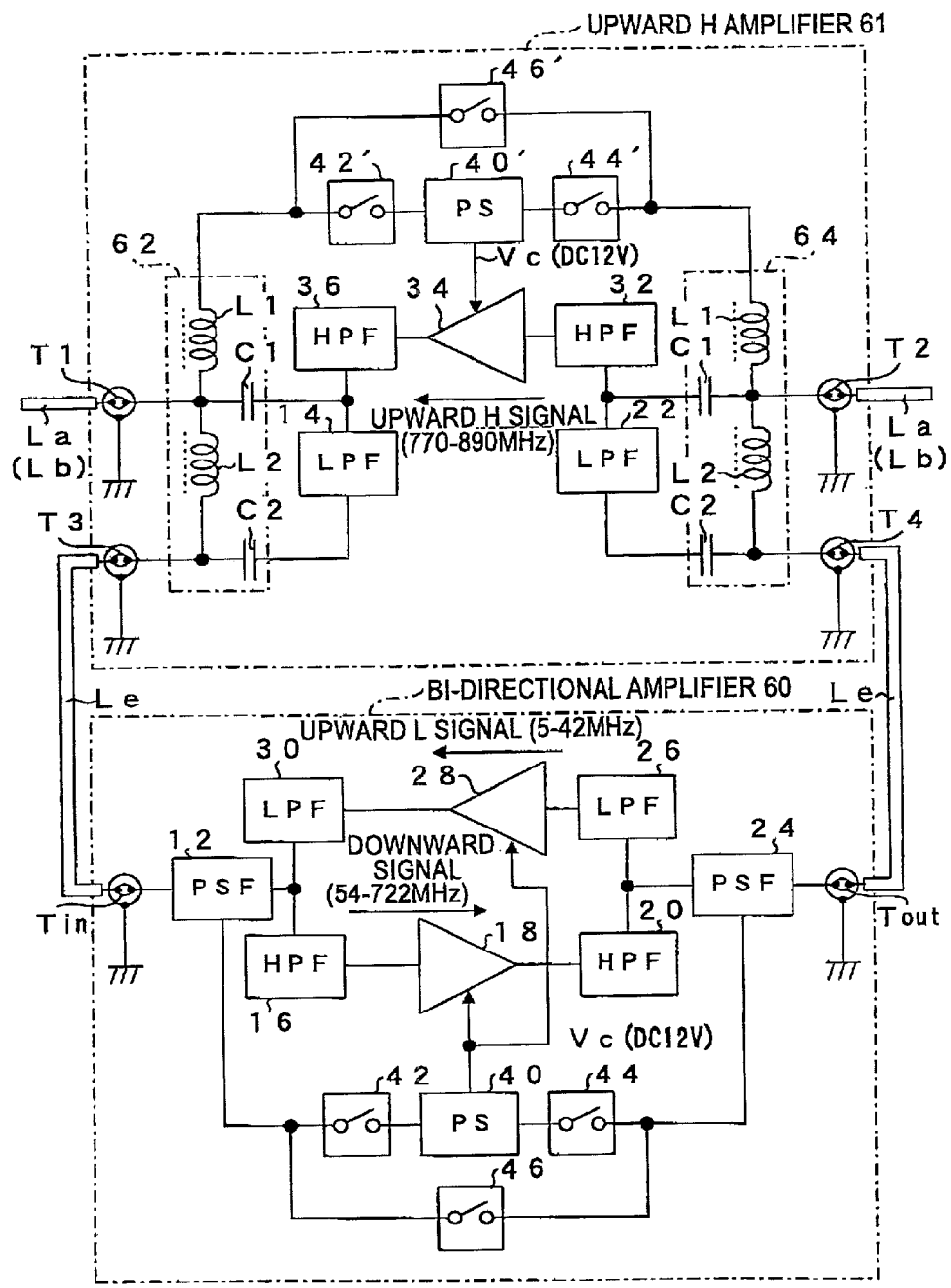
FIG. 5 is a block diagram showing a constitution of a separate-type CATV trunk amplifier (CATV extender amplifier) of an embodiment.

A CATV trunk amplifier 4 in FIG. 5 is different from the unit-type CATV trunk amplifier 4 shown in FIG. 2. The CATV trunk amplifier 4 in FIG. 5 is constituted with a bi-directional amplifier 60 and an upward H amplifier 61. This is what is called a separate-type CATV trunk amplifier.

The bi-directional amplifier 60 is a conventional CATV trunk amplifier (or CATV extender amplifier) generally used in the existing bi-directional CATV system, which bi-directionally transmits a downward signal and an upward L signal. Its constitution is the same as the unit-type CATV trunk amplifier 4 shown in FIG. 2, except that the bi-directional amplifier 60 does not include the upward H amplifying circuit 34, HPFs 32 and 36, and LPFs 14 and 22.

In the bi-directional amplifier 60, the downward signal, input to the input terminal Tin from the center equipment 2, is input to the downward amplifying circuit 18 via the power separation filter 12 and HPF 16. After being amplified to a predetermined level at the downward amplifying circuit 18, the downward signal is transmitted to the output terminal Tout via the HPF 20 and the power separation filter 24. The downward signal is then output to the terminal device from the output terminal Tout. The upward L signal, input to the output terminal Tout from the terminal device, is input to the upward L amplifying circuit 28 via the power separation filter 24 and the LPF 26. After being amplified to a predetermined level at the upward L amplifying circuit 28, the upward L signal is transmitted to the input terminal Tin via the LPF 30 and the power separation filter 12. The upward L signal is then output to the center equipment 2 from the input terminal Tin.

The alternating current power signals, input to the input terminal Tin or the output terminal Tout from the center equipment 2 side or the terminal device side, are input to the power supply circuit 40 via the switch 42 or 44, after being separated from the other transmission signals (in this case, the downward signal and the upward L signal) at the power separation filter (PSF) 12 or 24. If the switch 46 is ON, the alternating current power signals are further output to the outside via the bi-directional amplifier 60 from the terminal on the side opposite to the terminal at which the alternating current power signals are input.

The upward H amplifier 61 comprises an input terminal T1 and an output terminal T2 for respectively connecting the upward H amplifier 61 to the transmission line (trunk La) on the center equipment 2 side and on the terminal device side. The upward H amplifier 61 also comprises an upward H amplifying circuit 34, and the connection terminals T3 and T4, for respectively connecting the upward H amplifier 61 to the input terminal Tin and the output terminal Tout of the bi-directional amplifier 60.

The input terminal T1 and the output terminal T2 are respectively connected to the ends of the HPFs 36 and 32 and to the ends of the LPFs 14 and 22 via the power separation filters 62 and 64. The other ends of the HPFs 36 and 32 are respectively connected to the output terminal and the input terminal of an upward H amplifying circuit 34. The other ends of the LPFs 14 and 22 are respectively connected to the connection terminals T3 and T4, and to the bi-directional amplifier 60 via the power separation filters 62 and 64.

The power separation filters 62 and 64 are provided to separate the alternating current power signals, input to the input terminal T1 or the output terminal T2 via the transmission line (trunk La) on the center equipment 2 side or on the terminal device side, from the power unit 10. The power separation filters 62 and 64 separate the alternating current power signals from the transmission signals (a downward signal, an upward L signal, and an upward H signal), and respectively supply the alternating current power signals to the power supply circuit 40', inside of the upward H amplifier 61, and the power supply circuit 40 in the bi-directional amplifier 60.

Each of the power separation filters 62 and 64 comprises a condenser C1, one end of which is respectively connected to the input or output terminal T1, T2, and the other end of which is respectively connected to connection points between the HPF 36 and the LPF 14 or between the HPF 32 and the LPF 22, so that each of the above transmission signals can be passed to the HPFs 36, 32 and LPFs 14, 22. Each of the power separation filters 62 and 64 further comprises a choke coil L1, one end of which is connected to the input or output terminal T1, T2, and the other end of which is connected to the power supply circuit 40' via the switch 42' or the switch 44', so that the alternating current power signals can be supplied to the internal power supply circuit 40'. In addition, each of the power separation filters 62 and 64 comprise a choke coil L2, one end of which is connected to the input or output terminal T1, T2, and the other end is respectively connected to the connection terminal T3 or T4, so that the alternating current power signals can be transmitted to the bi-directional amplifier 60. Each of the power separation filters 62 and 64 also comprise a condenser C2, provided between the LPFs 14, 22 and the connection terminals T3, T4 and passing the downward signal and the upward L signal.

Specifically, each of the power separation filters 62 and 64 respectively comprises a choke coil L1 for supplying the alternating current power signals to the internal power supply circuit 40', and a choke coil L2 for supplying the alternating current power signals to the power supply circuit 40 of the bi-directional amplifier 60.

Additionally, the upward H amplifier 61 comprises, as well as the bi-directional amplifier 60, not only the switches 42' and 44', turned on/off by external operations to supply the alternating current power signals separated via the choke coil L1 of the power separation filter 62 or 64 to the internal power supply circuit 40', but also a switch 46' turned on/off for connecting or separating the connection points between the switches 42', 44' and the choke coils L1 so that the alternating current power signals can be supplied to the other amplifiers provided on the transmission line (trunk La) on the side opposite to the power unit 10.

The upward H amplifier 61, constituted as above, is externally attached to the bi-directional amplifier 60 with the connection terminals T3 and T4 respectively connected via the coaxial cable Le to the input terminal Tin and the output terminal Tout of the bi-directional amplifier 60. The transmission line (trunk La) on the center equipment 2 side is connected to the input terminal T1. The transmission line (trunk La) on the terminal device side is connected to the output terminal T2.

According to a CATV trunk amplifier 4 (or CATV extender amplifier 4') in which the upward H amplifier 61 is externally attached to the conventional bi-directional amplifier 60, the upward H signal transmitted from the terminal device side is selectively input to the upward H amplifying circuit 34 via the HPF 32. After the upward H signal is amplified at the upward H amplifying circuit 34, the upward H signal is output via the HPF 36 to the transmission line (trunk La) on the center equipment side from the input terminal T1.

Therefore, in the CATV trunk amplifier 4 (or CATV extender amplifier 4') shown in FIG. 5, just as in the unit-type CATV trunk amplifier 4 (or CATV extender amplifier 4') shown in FIG. 2, the number of filters passing the upward H signal can be reduced in half as compared to the number of filters used in a conventional amplifier. Thus, the same effect as in the previous embodiment can be obtained.

In the upward H amplifier 61, the connection terminal T3 is connected to the input terminal Tin of the bi-directional amplifier 60, and the connection terminal T4 is connected to the output terminal Tout of the bi-directional amplifier 60, so that the downward signal and the upward L signal can be selectively input and output to the bi-directional amplifier 60 respectively via the LPFs 14, 22. Furthermore, the alternating current power signals supplied via the transmission line (trunk La) on the center equipment 2 side or on the terminal device side are separated into signals for the bi-directional amplifier 60 and signals for the internal power supply circuit 40' via a pair of choke coils L1 and L2, so that the alternating current power signals can be supplied to each part of the system through the different paths. As a result, as compared to a unit-type CATV trunk amplifier 4, shown in FIG. 2, in which the alternating current power signals are separated at one choke coil L and supplied to the power supply circuit 40 common to the amplifying circuits 18, 28, 34, the distortion due to the hum modulation generated in an entire CATV trunk amplifier 4 can be reduced.

Specifically, in the CATV trunk amplifier 4 shown in FIG. 5, a current, corresponding to the power consumption at the upward H amplifying circuit 34, flows to the choke coils L1. A current corresponding to the power consumption at the downward amplifying circuit 18 and the upward L amplifying circuit 28 in the bi-directional amplifier 60 flows to the choke coils L2. Accordingly, the currents corresponding to the power consumption at each of the amplifying circuits do not intensively flow to one choke coil L, as is the case with a unit-type CATV trunk amplifier 4 shown in FIG. 2. Thus the amount of current flowing to the choke coils L1, L2 can be reduced and the generation of the distortion due to the hum modulation is restrained.

Specifically, a unit-type CATV trunk amplifier 4 shown in FIG. 2 and a separate-type CATV trunk amplifier 4 shown in FIG. 5 were experimentally produced in plural. The distortion due to the hum modulation per single amplifier 4 was measured. For the unit-type amplifier, the distortion was between −72.3 dB and −71.4 dB, and for the separate-type amplifier, between −72.5 dB and −72.3 dB. When a CATV trunk amplifier 4 is constituted as a separate-type amplifier as shown in FIG. 5, the distortion due to the hum modulation was improved by approximately 1 dB.

In addition, the hum modulation of the entire system changes according to the connection number of amplifiers 4 that receives a power supply from the common power unit 10, and the position in which the alternating current power signals are supplied. When eight CATV trunk amplifiers 4 were cascaded, and power was supplied from the common power unit 10 at a central connection point to each of the amplifiers 4, the hum modulation in the entire system was measured. The hum modulation in the case of using a unit-type amplifier for each of the amplifiers 4 was −57.8 dB. In the case of using a separate-type amplifier for each of the amplifiers 4 the hum modulation was −58.8 dB. The hum modulation in the entire system was also improved by approximately 1 dB.

The hum modulation HM is deteriorated according to an equation "HM=15·log (m)", and a separate-type CATV trunk amplifier 4 can improve the hum modulation approximately 1 dB as compared to a unit-type amplifier. Thus, a ratio of the number of CATV trunk amplifiers 4 capable of being added when a bi-directional CATV system is constituted using the separate-type CATV trunk amplifiers 4 is indicated as (m)=1.17. If the CATV trunk amplifier 4 used in the bi-directional CATV system is changed to a separate-type amplifier as shown in FIG. 5 from the unit-type amplifier shown in FIG. 2, the hum modulation in the entire bi-directional CATV system in which 16 CATV trunk amplifiers 4 are cascaded can be improved, even though two more CATV trunk amplifiers 4 (16 amplifiers multiplied by (1.17−1)=2.75) are further added to the system.

Accordingly, if a bi-directional CATV system is constituted using the separate-type CATV trunk amplifier 4 (or CATV extender amplifier 4') shown in FIG. 5, the number of the CATV trunk amplifiers 4 (or CATV extender amplifiers 4') can be further increased and the scale of the system can also be enlarged, as compared to the case of using the unit-type CATV trunk amplifier 4 (CATV extender amplifier 4') shown in FIG. 2.

Figure 6:
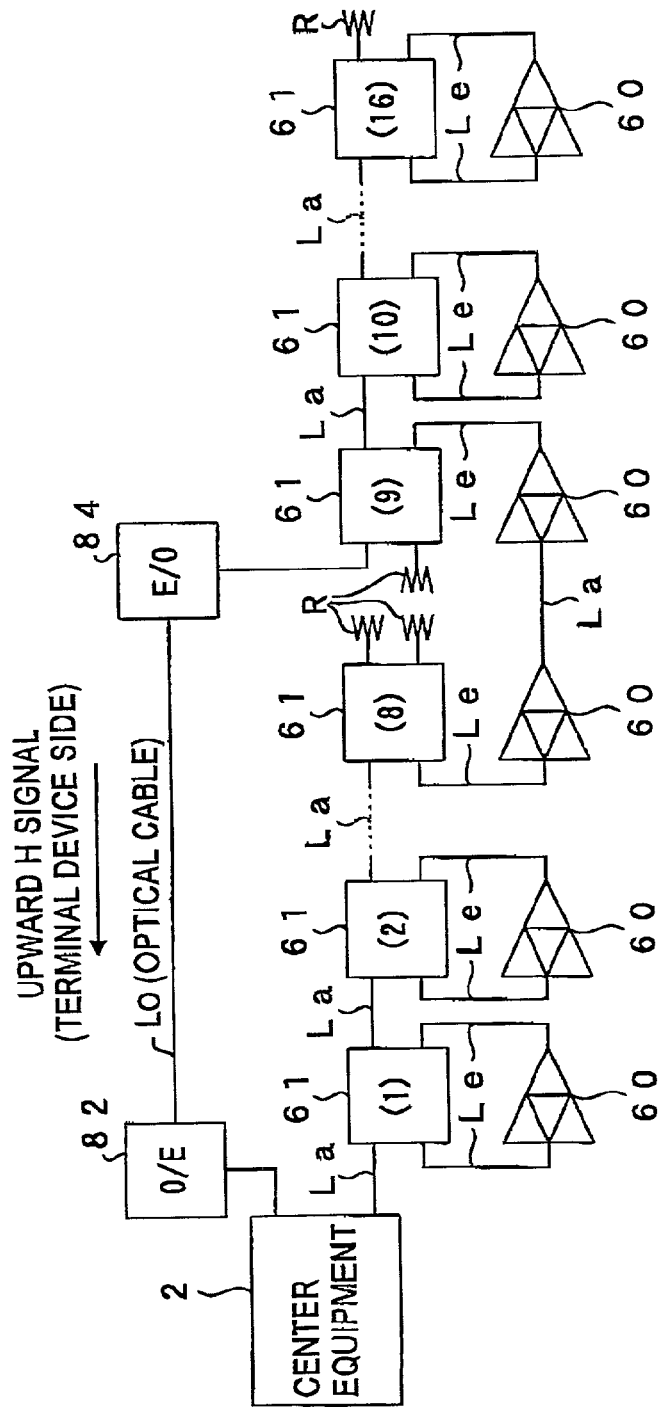
FIG. 6 is a diagram showing an example of constituting a bi-directional CATV system using a separate-type amplifier illustrated in FIG. 5.
Figure 7:
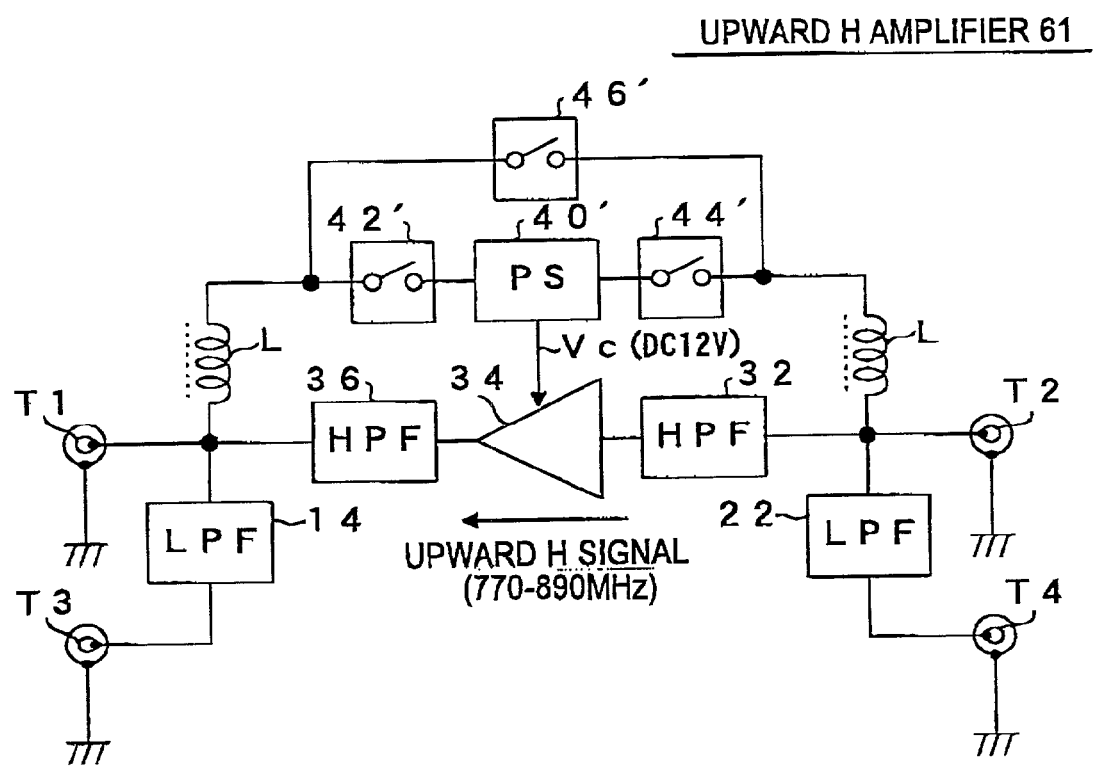
FIG. 7 is an explanatory view showing an example of another constitution of the upward H amplifier illustrated in FIG. 5.

Additionally, when the separate-type CATV trunk amplifiers 4 (or CATV extender amplifiers 4') shown in FIG. 5 are cascaded onto the trunk La (or the first branch lines Lb) to form a bi-directional CATV system, as shown in FIG. 6 for example, the output terminal T2 and the connection terminal T4 of the upward H amplifier 61 constituting the CATV trunk amplifier 4 at the eighth stage from the center equipment 2 side, and the connection terminal T3 of the upward H amplifier 61 constituting the CATV trunk amplifier 4 at the next (ninth) stage, may be respectively terminated at a terminal resistance R corresponding to the characteristic impedance of the coaxial cable constituting the trunk La. Then, the output terminal Tout of the bi-directional amplifier 60 at the eighth stage and the input terminal Tin of the bi-directional amplifier 60 at the ninth stage, to each of which an upward H amplifier 61 is externally attached, may be connected by the coaxial cable constituting the trunk La. The input terminal T1 of the upward H amplifier 61 at the ninth stage may be further connected to an electrical/optical converter (E/O) 84, converting an electrical signal to an optical signal. This electrical/optical converter 84 may in turn be connected to an optical/electrical converter 82 (O/E; converter converting an optical signal to an electrical signal) provided on the center equipment 2 side via an optical cable Lo.

In this manner, the upward H signal transmitted via the amplifiers (CATV trunk amplifiers 4 at the tenth to sixteenth stage in the FIG. 6), located closer to the terminal device than the CATV trunk amplifier 4 at the ninth stage, can be transmitted directly to the center equipment 2 via the electrical/optical converter (E/O) 84, optical cable Lo and optical/electrical converter (O/E) 82. It is then possible to reduce confluent noises transmitted to the center equipment 2, created on the transmission line by noise in a transmission frequency band of the upward H signal generated at each of the subscriber terminal devices, and to improve the accuracy of receiving the upward H signal by the center equipment 2.

In the bi-directional CATV system shown in FIG. 6, the separate-type CATV trunk amplifiers 4, comprising only the bi-directional amplifier 60 and the upward H amplifier 61, are arranged on the transmission line (trunk La). However, when a bi-directional CATV system is built in practice, the separate-type CATV trunk amplifiers 4 and other amplifiers (such as unit-type CATV trunk amplifiers 4, and CATV bridger amplifiers 6) may be arranged in combination.

While one embodiment of the present invention has been herein disclosed, the invention should not be limited to the described embodiment. Other modifications and variations might be possible within this scope.

For instance, in the separate-type CATV trunk amplifier 4 shown in FIG. 5, the power separating filters 62, 64 in the upward H amplifier 61, for supplying the alternating current power signals input from the input terminal T1 or the output terminal T2 to the internal power supply circuit 40' and the external bi-directional amplifier 60, are respectively constituted by a pair of choke coils L1, L2 and condensers C1, C2. However, since the HPFs 36, 32 connecting the input and output terminals T1, T2 and the internal upward H amplifying circuit 34 are generally provided with condensers arranged in series on the passing path of the signals, it is possible to cut off the alternating current power signals by themselves. On the contrary, the LPFs 14, 22 are provided with coils connected in series on the passing path of the signals so as to cut off the signals with frequencies higher than the cutoff frequency and to pass the signals with frequencies lower than the cutoff frequency, and the alternating current power signals can pass through the LPFs 14, 22 since condensers are generally not connected in series in the passing path of the signals. Therefore, it is possible to use the HPFs 36, 32 as the condensers C1, C2 for cutting off the alternating current power signals so that the condensers C1, C2 can be removed from the upward H amplifier 61, and to use the LPFs 14, 22 as the choke coils L2 for supplying the alternating current power signals to the bi-directional amplifier 60, so that the choke coils L2 can be removed from the upward H amplifier 61.

In this manner, it is not necessary to provide a pair of exclusive filter circuits comprising the condensers C1, C2 and the choke coils L1, L2, and the configuration of the upward H amplifier 61 can be simplified.

What is claimed is:

1. An upward signal amplifier, provided on a transmission line between center equipment of a bi-directional CATV system and a terminal device, for externally attaching to an existing CATV amplifier comprising:
   a downward amplifying circuit for amplifying a downward signal;
   an upward L amplifying circuit for amplifying an upward L signal, which is an upward signal in a first frequency band lower than a second frequency band of the downward signal;
   a first terminal and a second terminal for respectively connecting the existing CATV amplifier to the transmission line on a center equipment side and on a terminal device side;
   a pair of second filters, respectively connected to the first terminal and the second terminal, and to the downward amplifying circuit, for cutting off the upward L signal and selectively passing only the downward signal;
   a pair of third filters, respectively connected to the first terminal and the second terminal, and to the upward L amplifying circuit, for cutting off the downward signal and selectively passing only the upward L signal; and
   wherein the upward signal amplifier comprises:
   an upward H amplifying circuit for amplifying an upward H signal, flowing upwardly through the transmission line and in a third frequency band higher than the second frequency band of the downward signal;

a third terminal and a fourth terminal for respectively connecting the upward signal amplifier to the transmission line on the center equipment side and on the terminal device side;

a fifth terminal and a sixth terminal for respectively connecting the upward signal amplifier to the first terminal of the existing CATV amplifier and to the second terminal of the existing CATV amplifier;

a pair of first filters, respectively provided between the third terminal and the fifth terminal and between the fourth terminal and the sixth terminal, for cutting off the upward H signal and selectively passing the downward signal and the upward L signal; and a pair of fourth filters, respectively provided between the third terminal and the upward H amplifying circuit and between the fourth terminal and the upward H amplifying circuit, for cutting off the downward signal and the upward L signal and selectively passing only the upward H signal;

a pair of power separation filters, provided at least either between said third terminal and said first and fourth filters, or between said fourth terminal and said first and fourth filters, for separating alternating current power signals for a power supply, transmitted from an external power unit to the third terminal or the fourth terminal via said transmission line, from each of said downward, upward L and upward H signals; and a power supply circuit for generating a power voltage to operate said upward H amplifying circuit and supplying the power voltage to the upward H amplifying circuit upon receipt of the alternating current power signals separated at one of the pair of power separation filters, wherein the alternating current power signals separated at an other of the pair of power separation filters are output from said fifth terminal or sixth terminal to the first terminal of said existing CATV amplifier or the second terminal of said existing CATV amplifier.

2. An upward signal amplifier set forth in claim 1, wherein said fourth filters constitute high pass filters capable of cutting off said alternating current power signals;

said first filters constitute low pass filters capable of passing the alternating current power signals;

the one of said pair of power separation filters that supplies the alternating current power signals to said power supply circuit, includes a first choke coil connecting between either of said third terminal or fourth terminal and said power unit;

the other of said pair of power separation filters that supplies the alternating current power signals to said existing CATV amplifier includes a second choke coil connecting between the either of said third terminal or fourth terminal and a corresponding said fifth terminal or said sixth terminal.

3. A bi-directional CATV system comprising:

a transmission line between center equipment and terminal devices, a plurality of existing CATV amplifiers comprising:
  a downward amplifying circuit for amplifying a downward signal;
  an upward L amplifying circuit for amplifying an upward L signal, which is an upward signal in a first frequency band lower than a second frequency band of the downward signal;
  a first terminal and a second terminal for respectively connecting the existing CATV amplifier to the transmission line on a center equipment side and on a terminal device side;
  a pair of second filters, respectively connected to the first terminal and the second terminal, and to the downward amplifying circuit, for cutting off the upward L signal and selectively passing only the downward signal;
  a pair of third filters, respectively connected to the first terminal and the second terminal, and to the upward L amplifying circuit, for cutting off the downward signal and selectively passing only the upward L signal;

a corresponding upward signal amplifier externally attached to each of the plurality of existing CATV amplifiers comprising:
  an upward H amplifying circuit for amplifying an upward H signal, flowing upwardly through the transmission line and in a third frequency band higher than the second frequency band of the downward signal;
  a third terminal and a fourth terminal for respectively connecting the upward signal amplifier to the transmission line on the center equipment side and on the terminal device side;
  a fifth terminal and a sixth terminal for respectively connecting the upward signal amplifier to the first terminal of the existing CATV amplifier and to the second terminal of the existing CATV amplifier;
  a pair of first filters, respectively provided between the third terminal and the fifth terminal and between the fourth terminal and the sixth terminal, for cutting off the upward H signal and selectively passing the downward signal and the upward L signal; and
  a pair of fourth filters, respectively provided between the third terminal and the upward H amplifying circuit and between the fourth terminal and the upward H amplifying circuit, for cutting off the downward signal and the upward L signal and selectively passing only the upward H signal;

wherein in the plurality of existing CATV amplifiers connected to said transmission line via said upward signal amplifier, the fourth terminal and the sixth terminal of the upward signal amplifier provided for a first existing CATV amplifier, located at a predetermined distance from the center equipment side, are terminated at the characteristic impedance of the transmission line, a second terminal of the first existing CATV amplifier and a first terminal of a second existing CATV amplifier, located at a stage next to the first existing CATV amplifier, are directly connected via the transmission line, the fifth terminal of the upward amplifier provided for said second existing CATV amplifier is terminated at the characteristic impedance of the transmission line, and the third terminal of the upward signal amplifier provided for the second existing CATV amplifier is connected to the center equipment via an optical transmission path capable of converting an electrical signal to an optical signal, so that an upward H signal transmitted from the upward signal amplifier provided for the second existing CATV amplifier, located closer to the terminal device than the first existing CATV amplifier, is directly transmitted to the center equipment via the optical transmission path.

* * * * *